United States Patent [19]

Horber

[11] Patent Number: 4,827,164

[45] Date of Patent: May 2, 1989

[54] MAGNETICALLY ASSISTED STEPPING MOTOR

[75] Inventor: Ralph W. Horber, Marshfield, Mass.

[73] Assignee: Pacific Scientific Company, Rockford, Ill.

[21] Appl. No.: 66,375

[22] Filed: Jun. 23, 1987

Related U.S. Application Data

[63] Continuation of Ser. No. 612,563, May 21, 1984, Pat. No. 4,712,028.

[51] Int. Cl.$^4$ .................. H02K 1/24; H02K 21/38
[52] U.S. Cl. .................................. 310/49 R; 310/12
[58] Field of Search ................. 310/12, 15, 49, 154

[56] References Cited

U.S. PATENT DOCUMENTS

| | | | |
|---|---|---|---|
| 4,190,779 | 2/1980 | Schaeffer | 310/12 |
| 4,581,553 | 4/1986 | Moczala | 310/12 |
| 4,712,028 | 12/1987 | Horber | 310/49 R |
| 4,713,370 | 12/1987 | Mastromattei | 310/154 |
| 4,728,830 | 3/1988 | Gamble | 310/12 |
| 4,758,756 | 7/1988 | Pouillange | 310/12 |

Primary Examiner—Patrick R. Salace
Assistant Examiner—D. L. Rebsch
Attorney, Agent, or Firm—Stanger, Michaelson, Reynolds, Spivak & Tobia

[57] ABSTRACT

A stepping motor with toothed stator poles and toothed rotor poles is magnetically enhanced by locating permanently magnetized inserts in the spaces between the stator teeth and magnetizing the inserts transverse to the direction of movement of the rotor and substantially transverse to the direction in which the teeth extend. In a hybrid motor with a split and axially magnetized rotor, the inserts are magnetized to oppose the magnetization of the rotor. In a variable reluctance motor with an unmagnetized rotor, inserts are placed in both rotor and stator and magnetized to aid each other. Linear motors use either configuration.

31 Claims, 7 Drawing Sheets

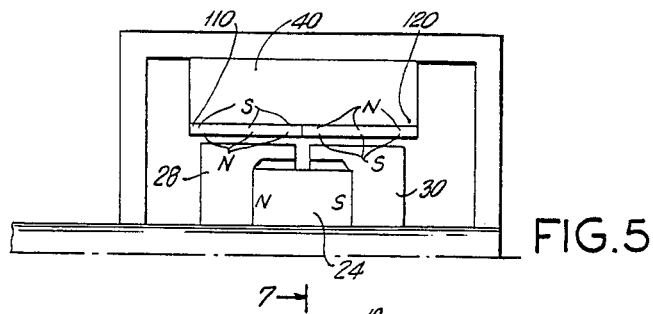
FIG.5
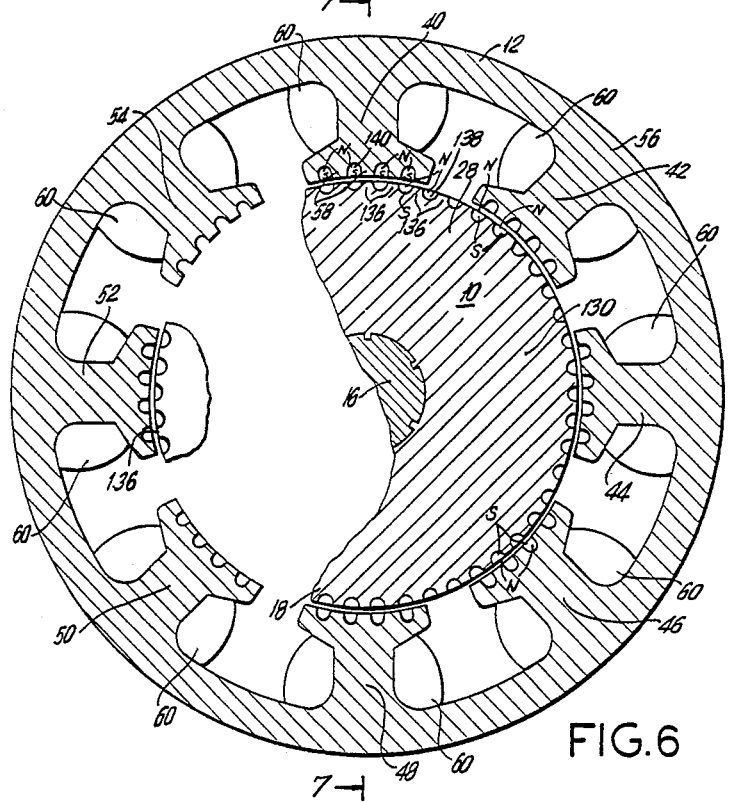
FIG.6
FIG.7

MAGNETICALLY ASSISTED STEPPING MOTOR

This is a continuation of application Ser. No. 612,563, filed May 21, 1984, now U.S. Pat. No. 4,712,028, issued Dec. 8, 1987.

BACKGROUND OF THE INVENTION

Field of the Invention

This invention relates to electric motors and particularly to stepping motors.

Generally, a stepping motor includes a rotor with outwardly-projecting peripherally-spaced longitudinally-extending rotor teeth which interact with inwardly-projecting peripherally-spaced longitudinally-extending stator teeth. The latter are mounted in sets on peripherally-spaced inwardly-projecting longitudinally-extending stator poles such that the stator-teeth on one pole may align with the opposing rotor teeth while teeth on another pole are partially misaligned with the rotor teeth and stator teeth on the next peripherally space pole align with the valleys between opposing rotor teeth. In so-called "hybrid" motors, rotors contain two axially aligned sections with the teeth of one section aligned with the valleys of the other section. A permanent magnet between the two rotor sections magnetizes the sections in opposite polarities. Appropriately energizing coils on the stator poles causes an interaction between the stator and the teeth that turns the rotor. In so-called variable reluctance stepping motors, the rotor with its rotor teeth is composed of soft magnetic material. The stator coils form a rotating field that moves the rotor incrementally. Such motors have limited efficiencies and other disadvantages.

Attempts have been made to increase the efficiencies of such motors, and to reduce such disadvantages as noise generated by them, by making the pitches on the stator teeth different from those on the rotor teeth. Attempts have also been made to increase torque by intensifying magnetic fields with stronger permanent magnets. Further efforts have been directed toward various techniques of energizing stator windings. However, the basic power and efficiency available from such motors has been limited.

An object of this invention is to overcome the deficiencies of existing motors.

Another object of the invention is to provide an improved motor having higher torque for a given coil current.

SUMMARY OF THE INVENTION

According to a feature of this invention, in motors having stator members and rotor members these objects are attained, in whole or in part, by placing permanent magnetic material in the spaces adjacent or between the teeth on one or both of the members and directing this magnetic material to oppose the magnetic flux from corresponding portions on the other of the members.

According to another preferred but not essential feature of the invention, the nature and size of the permanent magnetic material is such that its flux is greater than that in the nearby rotor teeth.

According to another feature of the invention, the magnetic material is placed adjacent to or between the stator teeth of a motor having an axially magnetized rotor.

According to another feature of the invention, the magnetic material is placed adjacent to or between the rotor teeth of a motor having an axially magnetized stator. According to yet another feature the magnetic material is placed adjacent to or between both and rotor teeth.

According to another feature of the invention, the magnetic material is placed adjacent to or between the teeth of a stator and adjacent to or between the teeth of a single section rotor and the magnetic material between the rotor teeth is poled to aid the material between the stator teeth, that is, with north pole facing south pole.

According to another feature of the invention, the radial dimension of the material in each tooth space is at least 0.5 times that of the peripheral width.

According to yet another feature of the invention, the magnetic material is a rare each cobalt. More particularly, the material is samarium cobalt.

According to still another feature of the invention, the material is a neodymium boron iron alloy.

According to another feature of the invention, the permanent magnetic material is placed between the teeth of a rotor or stator or both of a linear motor. According to yet another feature the permanent magnetic material is used with motors with skewed teeth.

These and other features of the invention are pointed out in the claims. Other objects and advantages of the invention will become evident from the following detailed description when read in light of the accompanying drawings.

BRIEF DESCRIPTION OF THE DRAWINGS

In the drawings:

FIG. 5 is a sectional view illustrating the magnetization of portions in FIGS. 2 and 3.

FIG. 6 is a radial section of another motor embodying feature of the invention.

FIG. 7 is a section 7—7 of FIG. 6.

DESCRIPTION OF THE PREFERRED EMBODIMENTS

Figure 1:
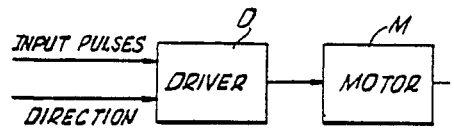
FIG. 1 is a block diagram of a motor system.

In FIG. 1 a driver D receives control pulses from an external source (not shown) and drives a motor M. The driver also receives an external rotation direction signal which instructs the drive D to rotate the motor in one or the other direction.

Figure 2:
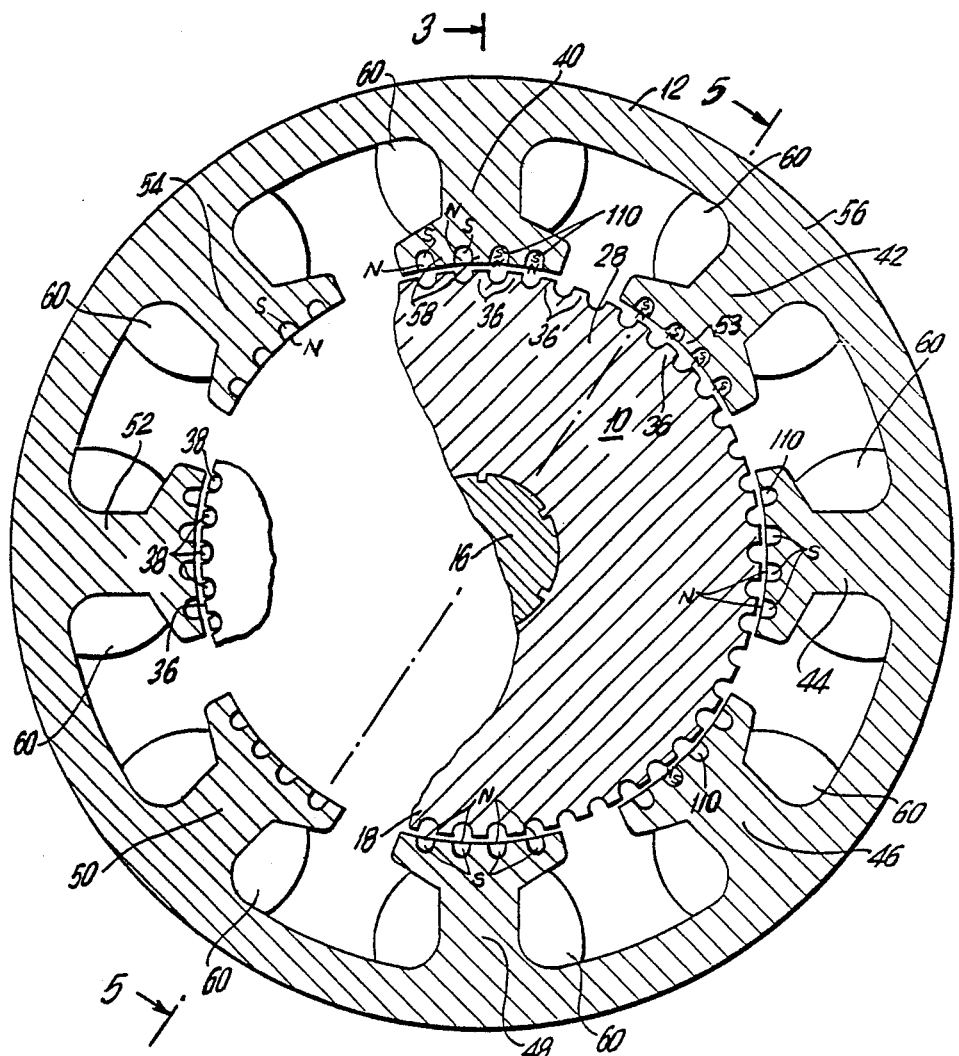
FIG. 2 is a sectional drawing of a motor embodying features of the invention.
Figure 3:
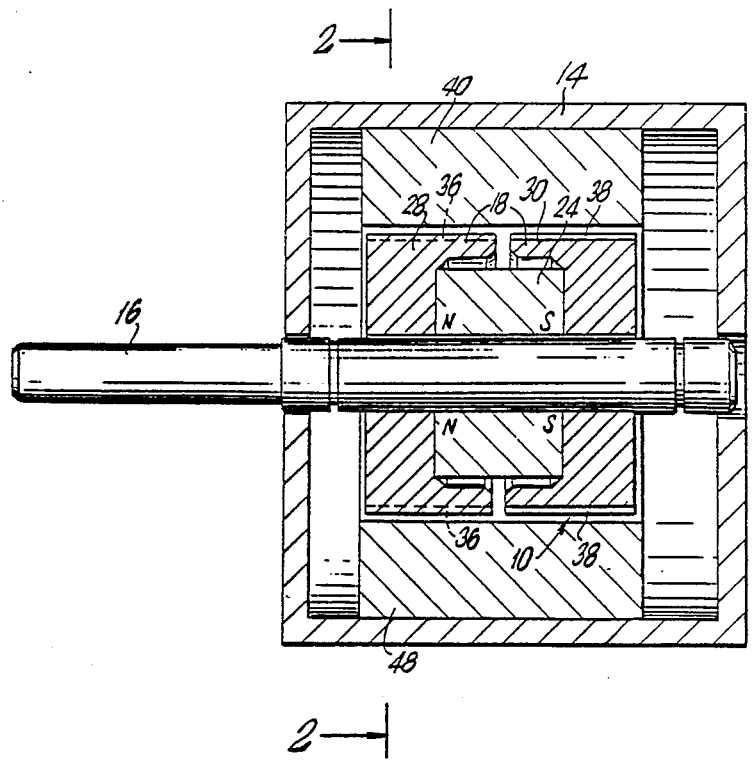
FIG. 3 is a section 3—3 of FIG. 2.

The motor M appears in more detail in FIGS. 2 and 3. In FIGS. 2 and 3, the rotor 10 rotates within a stator 12 mounted within a housing schematically shown as 14. Other than the windings, the motor shown is conventional. A shaft 16 projects through the housing and is keyed to the rotor 10 for rotation therewith. Suitable bearings (not shown) mount the rotor 10 and the shaft 16 to be rotatable within the housing 14.

Figure 4:
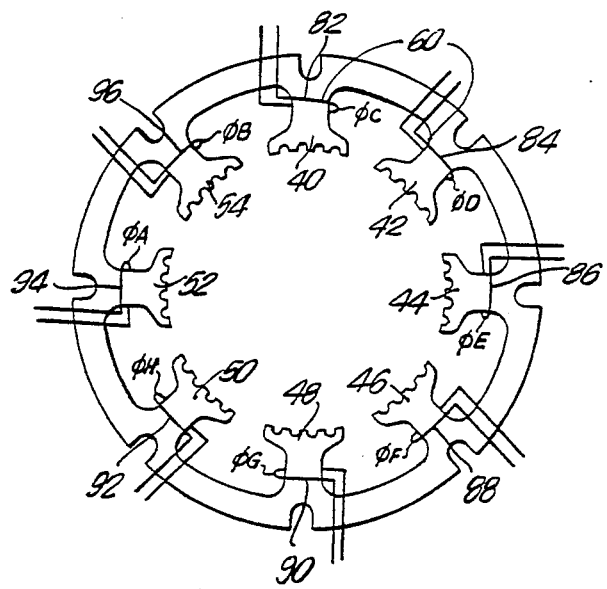
FIG. 4 is a schematic illustration showing the manner of energizing the poles of the stator in FIGS. 2 and 3.
Figure 8:
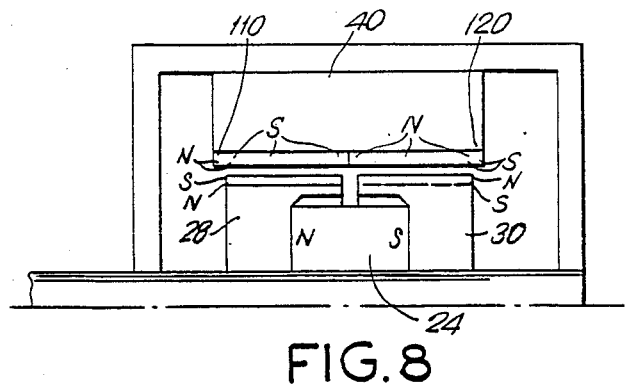
FIG. 8 shows another embodiment of the invention.

As specifically shown in FIG. 4 the rotor 10 is composed of a permanent magnet 24 and two cap-shaped rotor pole shoes 28 and 30 encapsulating the magnet 24 at its axial end to form front and rear rotor segments. The pole shoes 28 and 30 for simplicity, will also be referred to as rotor segments. As more particularly shown in FIG. 2, the rotor segment 28 carries fifty peripherally spaced teeth 36 projecting radially outward. Of course, the number of teeth shown is only an example Other embodiments of the invention utilize pole shoes with other numbers of teeth such as 40 or 48. In the example shown, the angular or peripheral tooth pitch, that is, the angular distance between like points on adjacent rotor teeth 36 is 7.2 degrees. As is readily ascertainable from FIG. 3, the entire segment 28 is magnetized by the permanent magnet 24 to exhibit a north polar magnetization. Although not shown, the teeth 36 are spaced about the entire periphery of the rotor segment 28. The teeth extend longitudinally along the axial direction of the rotor.

The rotor segment 30 is identical to the segment 28 and carries outwardly directed peripherally spaced radial teeth 38. However, the segment 30 is mounted on or keyed to the shaft 16 so that the rotor teeth are angularly offset by one-half tooth pitch and so they appear, looking axially, midway between the teeth 36. This is shown most precisely in the left hand portion of the rotor in FIG. 2. For simplicity, the rotor teeth 38 sticking out between and behind the rotor teeth 36 are not illustrated in the remainder of the rotor. However, it should be understood that rotor teeth do, in fact, exist in these locations behind the rotor segment 28.

As shown in FIG. 2, eight angularly displaced poles 40, 42, 44, 46, 48, 50, 52, and 54, project inwardly from a common circumscribing stator portion 56 to form the stator 12. The poles extend longitudinally along the entire axial dimension of the stator 12 beyond the rotor 10. Five stator pole teeth or stator teeth 58 form the inner radial ends of each pole 40 to 54. The pole teeth are formed along an imaginary cylindrical surface coaxial with the rotor and spaced slightly from the rotor teeth 36 and 38. In the embodiment shown, the pole teeth are pitched at 7.2 degrees. Thus, they have the same pitch as the rotor teeth 36 and 38. In this embodiment the rotor tooth pitch and the stator tooth pitch are the same. In others they are different. The poles 40 to 54 and their respective teeth 58 are angularly arranged so that the teeth on two opposite poles such as 40 and 48 can directly oppose the rotor teeth 36 on one pole shoe when teeth on poles 44 and 52 ninety degrees therefrom are completely out of alignment with the teeth 36 on the same pole shoe. The teeth 36 on the remaining forty-five degree angularly oriented poles 42, 46, 50, and 54 are angularly arranged so that they are ninety electrical degrees and 270 electrical degrees out of phase with the angular alignment of the rotor teeth 36 of the same pole shoe, in the same position.

The pole teeth 58 extend longitudinally parallel to the rotor axis from one end of the rotor 10 to the other. Thus, when the teeth 58 on the pole 52 and 44 are 180 electrical degrees out of alignment with the teeth 36 of the segment 28, they are completely aligned with the teeth 38 on the segment 30. At the same time the teeth 58 on the poles 40 and 48 are completely out of alignment with the teeth 38.

Stator coils 60 are used to magnetize the poles 40 to 54 in a sequence that causes rotation of the rotor. Details of the stator coils 60 and their arrangement on the stator appear schematically in FIG. 4. Here the eight coils are formed of eight respective windings 82, 84, 86, 88, 90, 92, 94, and 96 each representing one of eight phases P1 to P8.

In a typical conventional motor the poles are unenergized (O) or energized to produce a magnetic North (N) and South (S) pole sequence S-O-N-O-S-O-N-O of from one pole to the peripherally adjacent pole. A driver then responds to a pulse to change the magnetization sequence of the same poles to O-S-O-N-O-S-O-N, and to the next pulses to change the sequences to N-O-S-O-N-O-S-O, and O-N-O-S-O-N-O-S. etc. As a result the rotor turns ¼ rotor tooth pitch, i.e., one-quarter of the angular distance between corresponding portions of adjacent rotor teeth, in response to each pulse. Hence, each pulse moves the resultant magnetic vector 45° but moves the rotor only ¼ rotor tooth pitch. This quarter rotor tooth pitch is referred to as one rotor step in an eight pole motor.

The poling of the poles may be achieved either by the circuit shown in FIG. 4 where the polarity of current in the coils surrounding the stator poles is reversed electrically, or by surrounding each stator pole with two windings whose connections and winding directions are arranged to produce opposite polarities in response to the same energization and by switching between windings.

Typical means of driving the windings and different winding arrangements are well known. They are shown, for example, in U.S. Pat. No. 4,255,696, of John H. Field, assigned to the same assignee as this application.

According to the invention, the valleys between the stator teeth are filled with a high magnetic coercivity material such as samarium cobalt (SmCo$_5$). According to other embodiments of the invention, any magnetic rare earth cobalt or neodymium boron iron alloys or Ferrites or Alnicos are used. Included among known the magnetic rare earth materials are Nd and Sm. The magnets in the stator tooth valleys are magnetized as shown in FIG. 5. The motor is wound and driven as hereinbefore described or like any other two-phase hybrid stepping motor.

The effect of the magnetic materials 110 and 120 is to repel a flux from the adjacent rotor teeth and thereby concentrate the flux from the adjacent rotor teeth for interaction with the adjacent stator teeth. As shown for the poles 40 to 48 in FIG. 2, the interior surface of the material 110 in the stator valley is north polar. The opposing rotor teeth are also also north polar because of the magnetization of the magnet 24. Hence, the material 110 tends to repel the flux from the teeth 36 and concentrates it into the teeth 58.

If during the first pulse, the teeth 58 of poles 40 and 48 are magnetized to be South polar by the coil 60, and the teeth on poles 44 and 52 to be North polar, with the remaining teeth on poles 42, 46, 50, and 54 unenergized, the teeth 36 are more forcefully attracted to the teeth 58 of poles 40 and 48 by virtue of the effect of the material 110. This increases the holding torque, that is, the tendency of the rotor 10 to stop in that particular angular position. North polar magnetization of the teeth or poles 44 and 52 causes complete repulsion of the stator pole 44 and the rotor segment 28 by virtue of both the teeth 58 and the material 110. The rotor flux is thus directed toward the closest South polar teeth, for example, the South polar teeth two poles away. According to one embodiment of the invention any permanent magnet material 110 poled as shown would produce some results of this nature. However, according to a preferred embodiment the flux from the materials 110 and 120 in the valleys of the stator teeth are greater than the flux from the opposite rotor teeth.

When the driver D now shifts the energization of the coils 60 so that the teeth on poles 42 and 50 are south polar and on poles 46 and 54 north polar with the remaining poles unenergized, the north polar surfaces on the material 110 concentrates the north polar flux from the teeth 36 on the magnet 10 angularly toward the teeth 58 in the poles 42 and 50, produces repulsion in the poles 46 and 54, and further repulsion in the unenergized poles. This angular flux flow at the teeth at pulses 42 and 50 draws the rotor 10 clockwise toward an alignment of the teeth 36 in the rotor and the teeth 58 in the poles 42 and 50. If, by the time such alignment occurs, the succeeding pulse makes the teeth 58 of the poles 44 and 52 south polar, the alignment at the poles 44 and 52 will be that which had occurred during the previous pulse at the poles 42 and 50. This results in further drawing the rotor 10 clockwise. Succeeding pulses then each continuously draw the rotor 10 clockwise. In other words, as the energization of the poles 40 to 54 shifts from S-O-N-O-S-O-N-O to O-S-O-N-O-S-O-N, and further to N-O-S-O-N-O-S-O, and onto O-N-O-S-O-N-O-S, etc. The rotor keeps rotating clockwise.

On the opposite end of the rotor the teeth 38 are offset from the teeth 36 by one-half of the tooth pitch. Therefore, when teeth 58 on poles 40 and 48 face teeth 36 directly, the teeth 58 of the poles 52 and 44 face the teeth 38 on the stator portion 30. However, the rear stator portion is magnetized south polar. Therefore, the effect upon the rotation of the rotor by the poles 44 and 52 upon the rear of the rotor is the same as the effect of the poles 40 and 48 upon the front of the rotor. Generally stated, the stator poles effect on the rotor segment 28, e.g., pole such as 42 and 50, is the same as the effect of the poles 90 degrees therefrom, e.g., poles 46 and 54, upon the segment 30.

It s also known to energize the poles on a two-phase basis so as to produce the magnetizations S-S-N-N-S-S-N-N, N-S-S-N-N-S-S-N, N-N-S-S-N-N-S-S, etc. This type of energization is well known and the present invention also operates with such energization.

The operation of the motor is similar to that of the motor without the magnetic inserts 110. On the other hand, the magnetic inserts substantially improve the torque of the same motor without the inserts for the same currents applied. According to one example, the torque with a magnetic insert 110 is approximately 50 percent higher than the same motor without the inserts when each is operating at the same rated current.

While the theory upon which the present invention relies is not necessary for the purpose of patentability, the improvement provided by the present invention is believed to arise from the fact that the added permanent magnets overcome the negative torque component that is thought to occur at specific pole locations during each pulse of prior art rotors, and to enhance the positive torque that is thought to occur during each pulse.

FIGS. 6 and 7 illustrate another embodiment of the invention. Here the motor is in the form of a variable reluctance motor whose rotor 10 is composed of a soft magnetic material 130 from the front to the rear of the motor. The soft magnetic material may be in the form of laminations. The rotor 130 includes teeth 136 corresponding to the teeth 36 of FIG. 2. Located between the teeth 136 are inserts extending from the front of the rotor to the rear and magnetized as shown, namely, so that the North pole is at the outer periphery and the South pole closer to the trough of the valleys between the teeth 136.

In FIG. 6, the poles 40 to 54 and the windings 60 correspond to those of FIG. 2. The valleys between the stator teeth 58 are filled with inserts magnetized as shown, namely, with South poles toward the crest of the teeth and North poles toward the trough of the valleys. When the stator inserts 140 are aligned with the rotor inserts 138, the magnetic fields aid each other, that is, north faces south. Thus, starting from the stator teeth valleys and ending in the rotor teeth valleys along the radially direction, the magnetic poles follow the sequence N-S-N-S. According to another embodiment of the invention, the poles follow the sequence S-N-S-N. In each case these magnetizations extend longitudinally from the front of the rotor and stator to the rear of the rotor and stator.

In the position shown in FIG. 6, the magnetic inserts 140 of the poles 40 and 48 aid the magnetization of the inserts 138 in the opposite rotor sections. On the other hand, the magnetic inserts 140 in the valleys of the poles 44 and 52 face the teeth of the opposite rotor sections. The inserts of the poles 42 and 50 tend to draw the rotor inserts 138 in a direction to move the rotor clockwise, and the corresponding inserts in the poles 46 and 54 tend to produce a counterclockwise movement in the rotor.

In operation, the windings 60 are excited to produce a rotating magnetic field around the rotor. For example, the teeth 58 of the stator may be polarized by the excitation of the windings 60 to produce the polarities S-N-N-S-S-N-N-S in the poles 40 to 54 during one pulse, S-S-N-N-S-S-N-N in the poles 40 to 54 during the next pulse, N-S-S-N-N-S-S-N in the poles 40 to 54 during the next pulse, etc. At the time of the first pulse, the appearance of S polarity in the teeth 58 of the pole 40 makes the entire inner peripheral surface of the pole 40, and also the pole 48 South polar, thereby diminishing the holding effect of the aiding magnetic fields produced by the inserts 138 and 140 at the pole 40. Simultaneously, the North polar magnetization of the teeth of the poles 42 and 50 draws the teeth of the rotor 10 and ajds in the alignment of the inserts 138 and 140 at the poles 42 and 50 so as to draw the rotor 10 in the clockwise direction. The North polar teeth at the poles 44 and 52 attract the adjacent rotor teeth and aid in the clockwise torque, while the South polar teeth of the poles 46 and 54 make the entire inner periphery of the poles South polar. As a result, the rotor turns clockwise during the pulse period. The S-S-N-N-S-S-N-N magnetization of the poles 40 to 54 respectively during the next pulse period has similar affects, except upon the succeeding poles in the clockwise direction so as to move the rotor even further clockwise.

Figure 9:
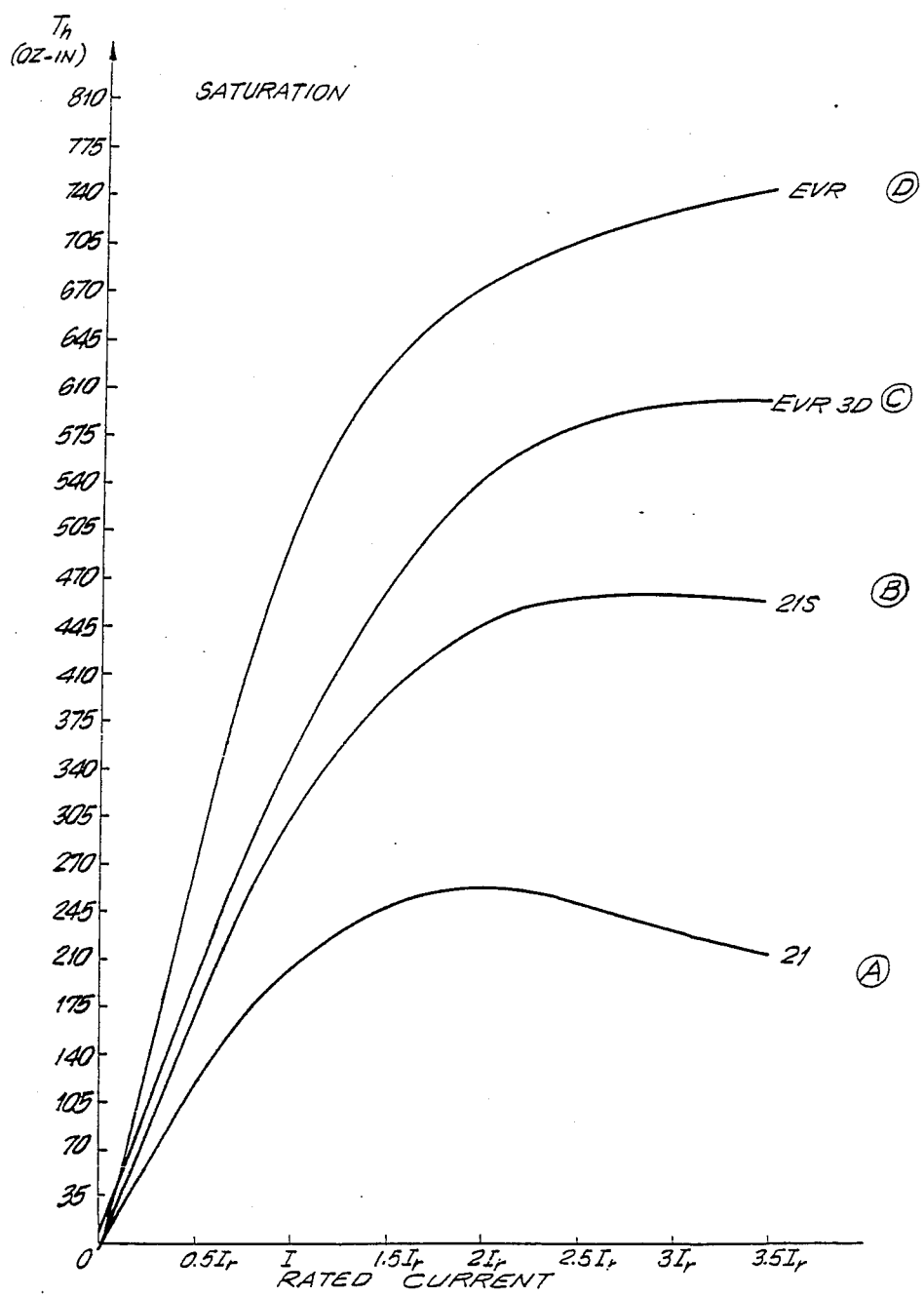
FIG. 9 is a graph illustrating the torque produced relative to current of the motors in FIGS. 2 to 7.

The invention may also be practiced with a motor such as FIGS. 2 and 3 using inserts in the valleys between the teeth of the stator poles and the valleys between the teeth of the rotor. This embodiment is shown in FIG. 9.

Preferably, the material of the inserts 110, 138, and 140 is samarium cobalt. According to another embodiment of the invention, the material is a neodymium boron iron alloy. Of course, materials such as Alnico may also be used. The term samarium cobalt refers to SmCo$_5$. However, it may also refer to Sm$_2$Co$_{17}$.

The magnetic inserts 110, 138 and 140 are preferably formed by forming the ingredients into a powder, pressing the latter, sintering them, and gluing them into the valleys.

In the motors of FIGS. 1 to 8, there is a relationship between the coercive force of the permanent magnetic material used for the inserts 110, 138, and the required ratio of axial depth to peripheral width of the inserts 110, 138. Insert materials of greater coercive force require smaller depth-to-width ratios for optimum operation. Materials of lower coercive force require larger depth-to-width ratios. Conversely, motors with greater depths-to-width ratios can operate with lower coercive force materials, and motors with lesser depth-to-width ratios, need higher coercive force materials.

The following Table illustrates preferred ranges of depth to width ratios and coercive forces for various materials. In the Table, Width represents peripheral width and Depth the axial depth. The coercive forces are in Oersteds.

TABLE

| Material | Preferred Range of Depth-to-Width Ratios | Preferred Range of Coercive Force in Oersteds | Desireable Depth-to-Width Ratio | Typically Available Coercive Force in Oersteds |
|---|---|---|---|---|
| Alnico 8 | .8:1 to 5:1 | 1400 to 1900 | 4:1 | 1700 |
| Ceramic 1 | .8:1 to 5:1 | 1600 to 2100 | 4:1 | 1900 |
| Ceramic 8 | .5:1 to 5:1 | 2500 to 3300 | 3:1 | 3000 |
| SmCo$_5$ | .2:1 to 5:1 | 4000 to 9000 | .5:1 | 8000 |
| Sm$_2$Co$_{17}$ | .25:1 to 5:1 | 3000 to 8000 | .8:1 | 7000 |

The ranges in the Table represent that is presently known to be needed for producing at least significant improvement in the operation of a hybrid motor such as in FIGS. 2 and 3 having the same size, weight, and electrical input. A significant improvement is defined as an increase in torque of 20% over a prior art hybrid (e.g. axially magnetized rotor) motor of equal size and wight energized by the same current.

Figure 10:
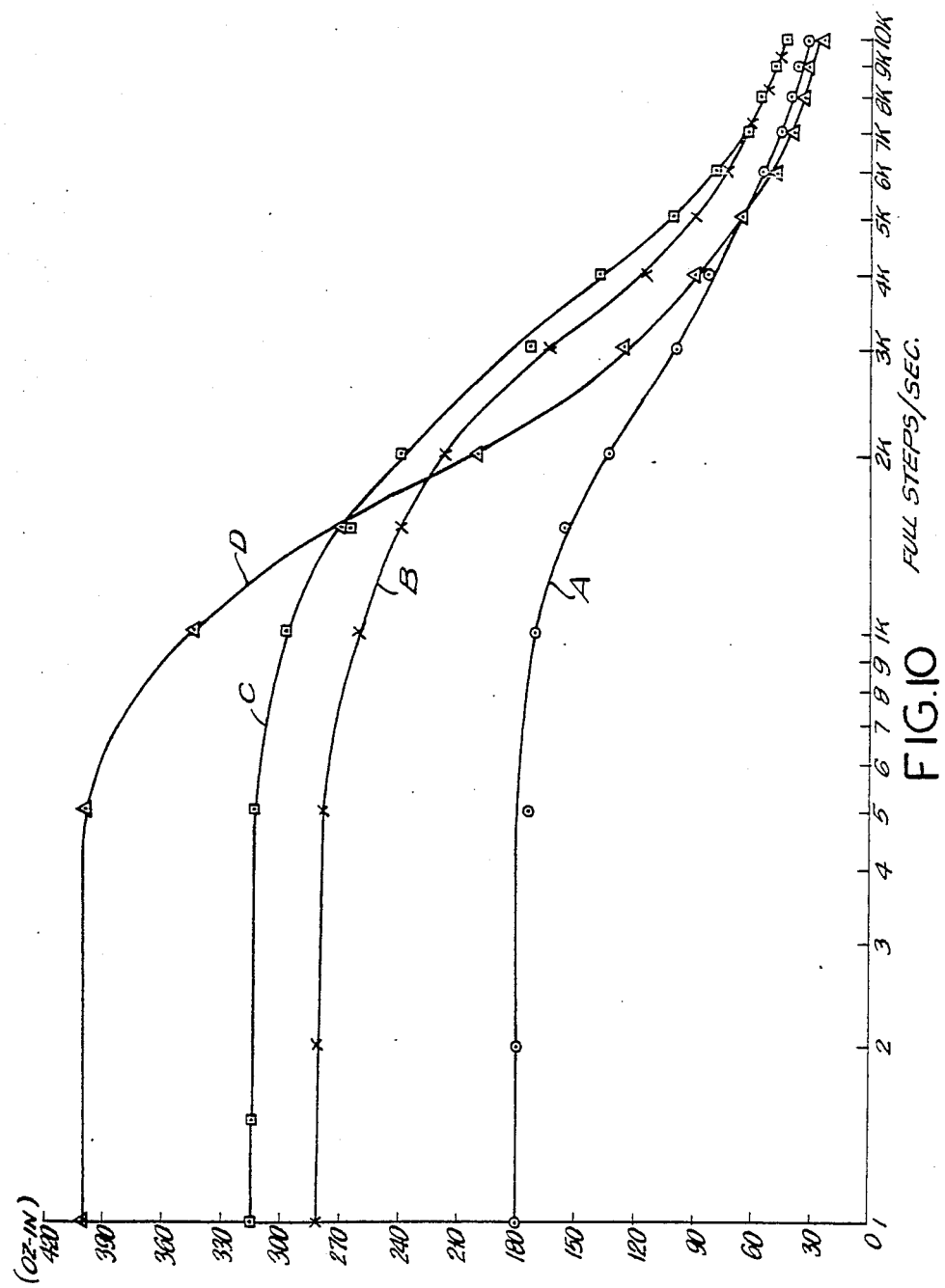
FIG. 10 is a graph showing the torque produced relative to speed at a given current of the motors of FIGS. 1–9.

FIGS. 9 and 10 are graphs illustrating characteristics of operation of motor manufactured according to the prior are and according to the embodiments of FIGS. 2 and 3, 6 and 7, and 9. FIG. 9 compares the holding torques of the motors to rated current. In FIG. 10 the speed in full steps per second is compared with the holding torque in ounce-inches with the motors driven by substantially the same 35 volt bi-polar chopper at a rated current of 5.82 amperes. The holding torque was measured by applying a brake and measuring the maximum torque before stall. A linear relationship exists between stepping torque and holding torque such that the stepping torque is equal to 0.707 of the holding torque.

In FIGS. 9 and 10, curves A represent operation of an ordinary prior art "hybrid" motor such as that shown in FIGS. 2 and 3 without the samarium cobalt permanent magnet inserts. The curves B represent the operation of a corresponding motor modified according to the invention as embodied in FIGS. 2 and 3 using SmCo$_5$ permanent magnet inserts. The curves C represent the operation of the embodiment shown in FIG. 8 using a hybrid motor with SmCo$_5$ inserts in rotor and stator tooth valleys. The curves D represent the operation of a motor corresponding to that used in FIGS. 6 and 7, with samarium cobalt inserts 138 and 140 in the stator and rotor tooth valleys, i.e., with rotor teeth aligned axially and without a magnet between front and rear rotor sections. It will be seen that except at very high speeds, the holding torque, and hence, the stepping torque of motors embodying the invention is considerably greater than motors according to the prior art.

It should be recognized that in the motor of FIGS. 6 and 7, the direction of the initial pulse of the motor determines the direction of the rotation.

Figure 11:
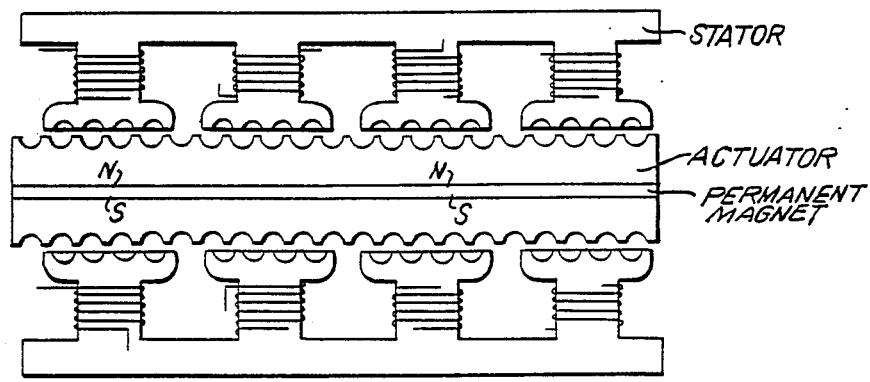
FIGS. 11 and 12 are schematic representations of linear motors embodying the invention.

The invention may also be embodied in a linear motor. Such a linear motor is shown in FIG. 11 wherein pole teeth valleys of the stator include magnetic material magnetized as shown. The linear motor of FIG. 11 corresonds to that of FIGS. 2 and 3 in that the rotor material is magnetized.

Figure 12:
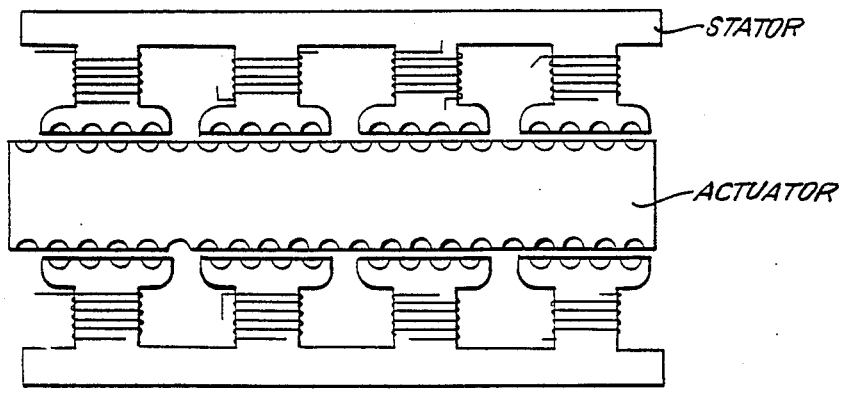

FIG. 12 illustrates a linear motor corresponding to the motor of FIGS. 6 and 7 wherein the rotor is composed of soft magnetic material.

Figure 13:
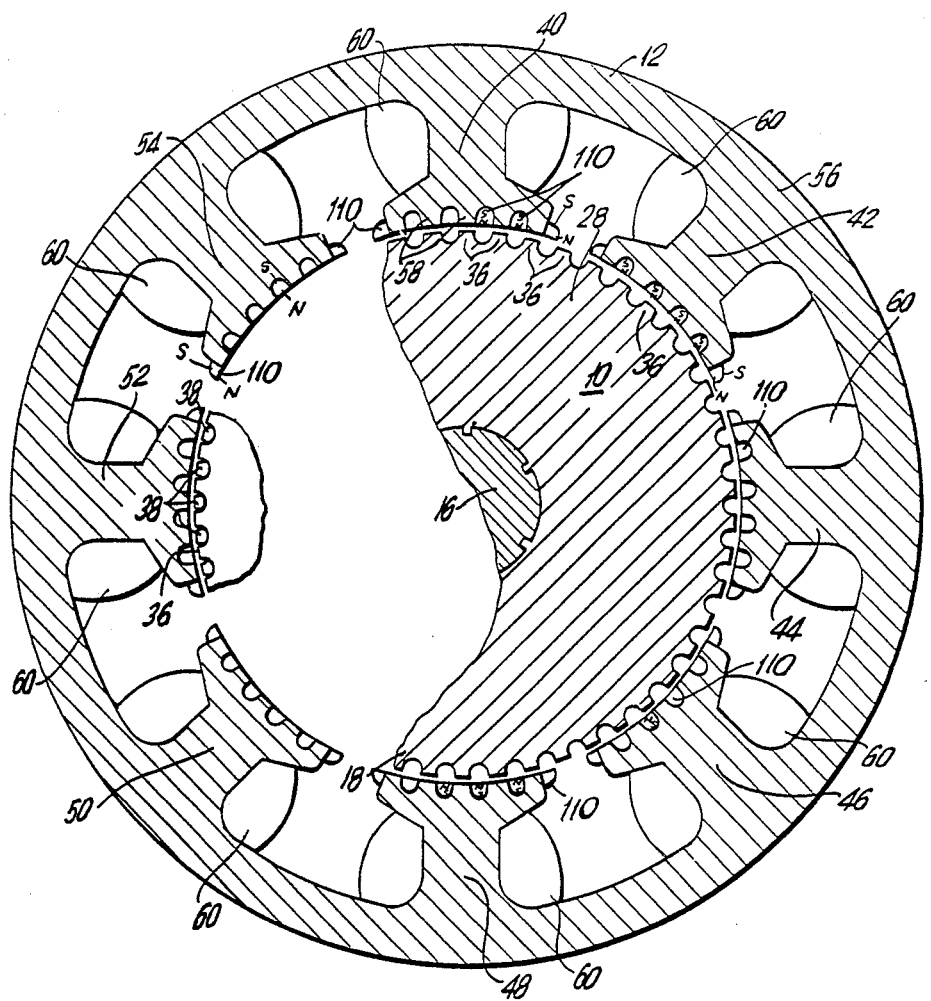
FIGS. 13 to 15 illustrate portions of other embodiments of the invention.
Figure 14:
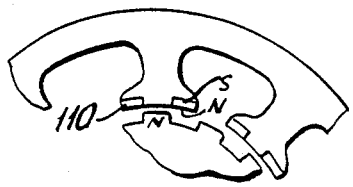

According to embodiments of the invention the permanent magnetic materials are also placed adjacent the end teeth of the stator poles. This is shown in FIG. 13. Where a stator pole has only one single tooth, the magnetic materials are secured adjacent the single tooth. This is shown in FIG. 14. These stator teeth may be used in any of the motors of the other embodiments shown.

Figure 15:
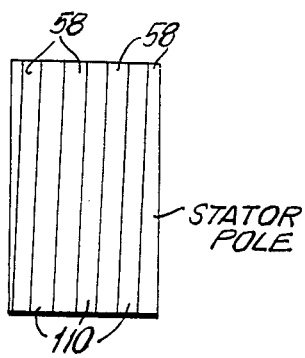

The invention is applicable not only to stators and rotors with teeth parallel to the axis of rotation, but also to stators and rotors whose teeth are skewed by a fraction of a tooth pitch as shown in FIG. 15. Skewed teeth have the effect of smoothing the rotation of the rotors.

The term samarium cobalt as used with respect to FIGS. 9 and 10 refers to SmCo$_5$. However, the invention also contemplates using Sm$_2$Co$_{17}$ for its higher coercivity. The term samarium cobalt is thus intended, with respect to FIGS. 1 to 8 to refer both to SmCo$_5$ and Sm$_2$Co$_{17}$.

Stepping motors have existed for many years and various means have been attempted to increase the torque output. The present invention furnishes a substantial increase from prior art devices of same, weight, size, and electrical power inputs.

While embodiments of the invention have been described in detail, it will be evident to those skilled in the art that the invention may be embodied otherwise without departing from its spirit and scope.

What is claimed is:

1. A stepping motor, comprising:
   a stator;
   a plurality of poles on said stator;
   a winding on each of said poles;
   a plurality of spaced stator teeth on said poles, each of said poles having at least one tooth;
   a mover movable relative to said stator;
   said mover having a plurality of spaced mover teeth located for movement along a first direction past said stator pole teeth;
   said mover teeth and said stator teeth forming spaces along a path of relative mover-stator movement and depths transverse to the path of movement;
   a plurality of permanently magnetic inserts located adjacent the plurality of mover teeth or the plurality of stator teeth and poled in the direction of the depth of the spaces.

2. A motor as in claim 1, wherein said inserts are located in spaces adjacent the stator teeth.

3. A motor as in claim 1, said inserts are located in spaces adjacent the mover teeth.

4. A motor as in claim 1, wherein said inserts are located in the spaces adjacent the mover teeth and stator teeth.

5. A motor as in claim 1, wherein said mover teeth extend substantially transverse to the path of movement and the direction of the depth.

6. A motor as in claim 1, wherein said mover teeth are skewed relative to the transverse direction of the path of movement by a fraction of a tooth pitch.

7. A motor as in claim 1, wherein said permanently magnetic insert includes samarium cobalt.

8. A motor as in claim 1, wherein said permanently magnetic insert includes a neodymium-boron alloy.

9. A motor as is claim 2, wherein said mover teeth extend transverse to the path of movement and the direction of the depth.

10. A motor as in claim 1, wherein said mover teeth are skewed relative to the transverse direction of the path of movement by a fraction of a tooth pitch.

11. A motor as in claim 9, wherein said magnetic insert includes samarium cobalt.

12. A motor as in claim 10, wherein said mover teeth extend transverse to the path of movement and the direction of depth.

13. A motor as in claim 9, wherein said magnetic insert includes a neodymium-boron alloy.

14. A stepping motor, comprising:
a stator;
a plurality of poles on said stator;
a plurality of spaced stator teeth on each of said poles;
winding means for energizing each of said poles so as to magnetize the plurality of teeth on any one of said poles in the same direction at any one time;
a mover movable relative to said stator;
said mover having a plurality of spaced mover teeth located for movement along a first direction past said stator pole teeth;
said mover teeth and said stator teeth forming spaces having widths along the direction of movement and depths transverse to the direction of movement; and
a plurality of permanent magnet structures each located adjacent to one of the plurality of said stator teeth and poled in the direction of the depth of the spaces, each of said structures being located adjacent said teeth along the direction of movement.

15. A motor as in claim 1, wherein said rotor is linear and said poles are linearly aligned.

16. A motor as in claim 1, wherein said rotor rotates about an axis relative to said stator.

17. A motor as in claim 2, wherein said rotor rotates about an axis relative to said stator.

18. A motor as in claim 3, wherein said rotor rotates about an axis relative to said stator.

19. A motor as in claim 16, wherein the inserts in said stator valleys and the inserts in said mover valleys are poled so that when a mover insert faces a stator insert the magnetization of the poles facing are of opposite polarity.

20. A motor as in claim 1, wherein the coercive force and dimensions of the inserts is sufficiently great to produce a significant improvement in the operation of a hybrid motor of the same size, weight, and electrical power input.

21. A motor as in claim 1, wherein said structures are located adjacent said teeth in the direction of the path of movement.

22. A motor as in claim 1, wherein each of said structures is located adjacent a different one of the plurality of stator teeth or a different one of said mover teeth.

23. A stepping motor, comprising:
a stator;
a plurality of poles on said stator;
a first set of spaced teeth on said poles, each of said poles having at least one tooth;
a second set of spaced teeth on said mover at locations for movement along a direction past said first set of teeth, said first and second set of teeth forming a gap with each other and having lengths extending along the gap in a direction substantially parallel to the gap;
said first set of teeth and said second set of teeth having widths along the direction of movement and depths transverse to the direction of movement of the mover relative to the stator;
a permanently magnetized material contiguously adjacent a plurality of the teeth in one of the sets of teeth; and
said magnetized material being poled in the direction of the depth of the teeth.

24. A motor as in claim 23, further comprising magnetized magnetic material contiguously adjacent a plurality of the teeth in the other of the sets of teeth.

25. A motor as in claim 23, wherein permanently magnetized material is contiguously adjacent each of the teeth in the one of the sets of teeth.

26. A motor as in claim 24, wherein permanently magnetized material is contiguously adjacent each of the teeth in the one of the sets of teeth and in the other of the sets of teeth.

27. A motor as in claim 23, wherein the one of the sets of teeth is on said stator.

28. A motor as in claim 25, wherein the one of the sets of teeth is on said stator.

29. A motor as in claim 24, wherein the other one of the sets of teeth is on said mover.

30. A motor as in claim 26, wherein the other one of the sets of teeth is on said mover.

31. A motor as in claim 23, wherein said magnetized material extend contiguously from one tooth to another at a plurality of said teeth.

* * * * *